Nov. 16, 1948.   H. N. IRVINE   2,454,063
REEL AND RAKE APPARATUS FOR COMBINES
Filed Oct. 28, 1944   2 Sheets-Sheet 2

Inventor:
Houston N. Irvine

Patented Nov. 16, 1948

2,454,063

UNITED STATES PATENT OFFICE 2,454,063

REEL AND RAKE APPARATUS FOR COMBINES

Houston N. Irvine, Burlington, Iowa, assignor to J. I. Case Company, Racine, Wis., a corporation of Wisconsin Application October 28, 1944, Serial No. 560,779

3 Claims. (Cl. 56—219)

1

My invention relates to a reel and rake apparatus for combines.

One of the objects of my invention is to provide an improved reel and rake apparatus for combines in which a flexible endless belt-like member serves both as a reel for drawing and holding the material to be cut against the sickle and also as a rake for feeding the material, after it has been cut, upwardly and rearwardly to the threshing mechanism, thereby avoiding the necessity of the usual canvas conveyor in a combine header.

In the drawings, in which an embodiment of my invention is shown,

Figure 1:
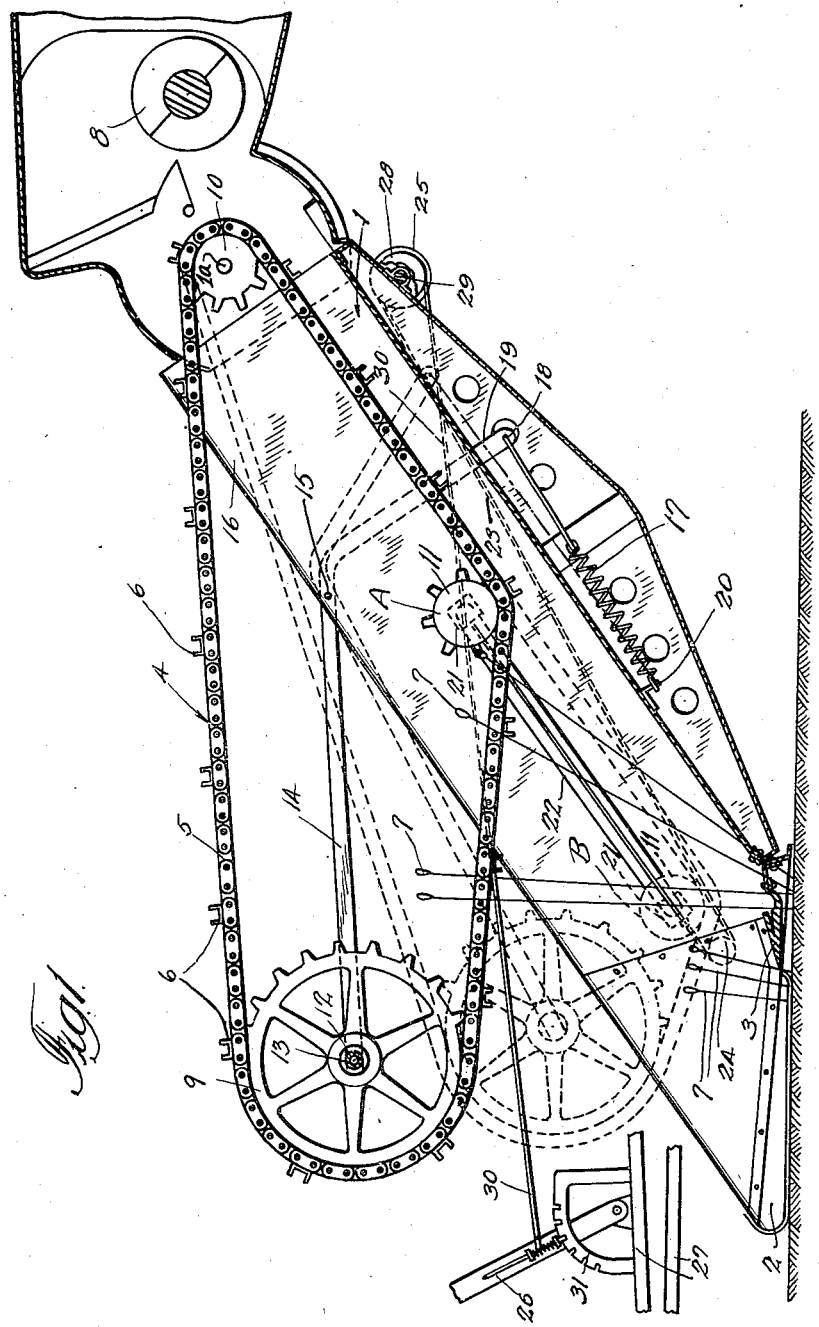
Figure 1 is a side elevational sectional view substantially on the line 1—1 of Fig. 2 of a combined reel and rake apparatus.
Figure 2:
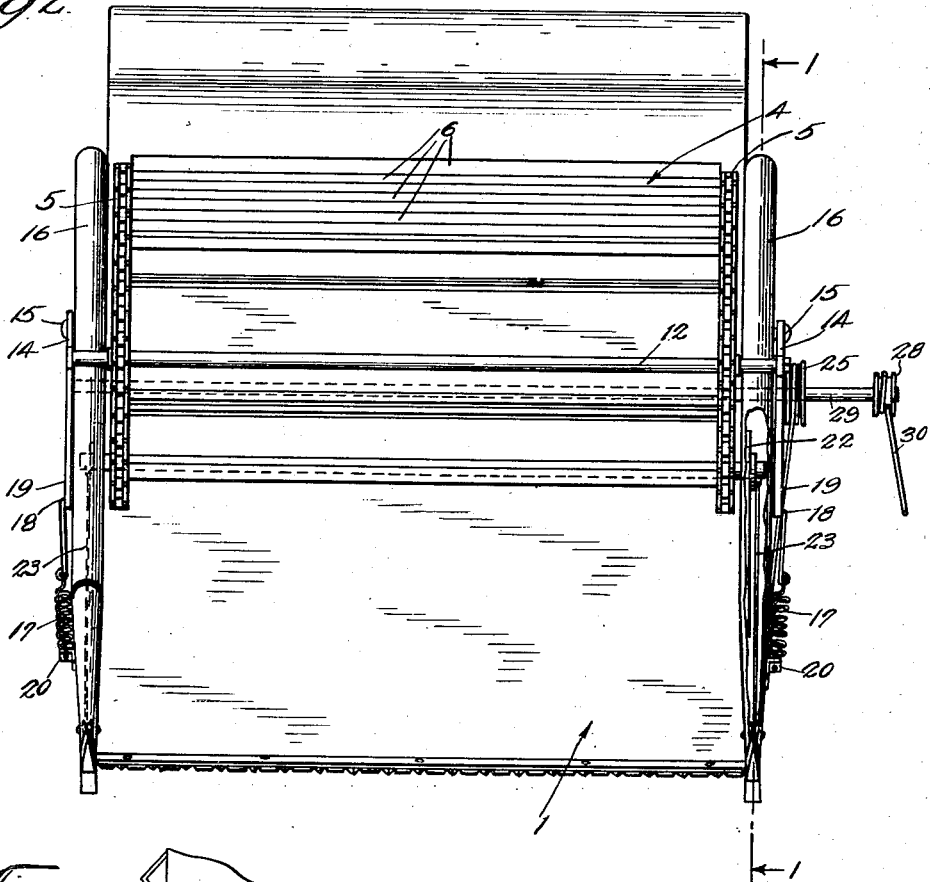
Fig. 2 is a front view of this apparatus, parts being omitted and parts being shown in section.
Figure 3:
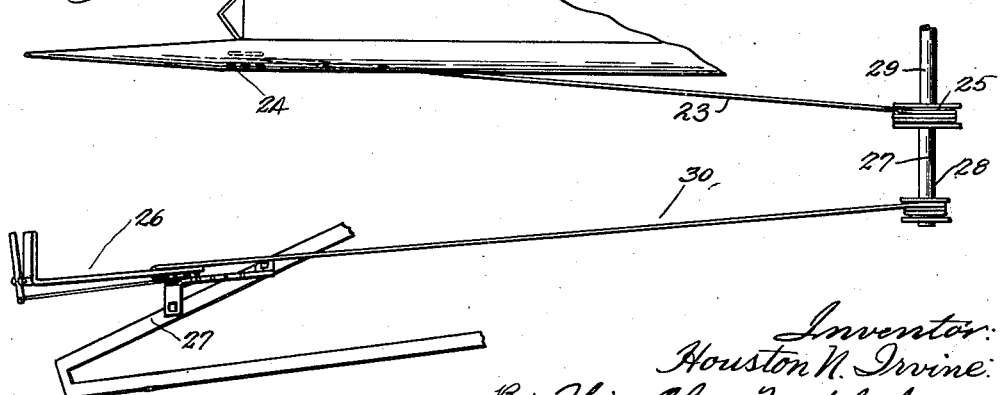
Fig. 3 is a somewhat diagrammatic plan view showing a portion of the header, the drawbar and a control lever.

Referring to the drawings in detail, the construction shown comprises an upwardly and rearwardly inclined chute or deck 1 which is pivotally attached at 1ᵃ to the combine in such a way that its front end is floatably supported by shoes 2 which may rest on the ground as the combine is drawn along, the chute 1 oscillating about the pivotal attachment 1ᵃ as the shoes 2 move up and down over uneven ground, a sickle 3 carried by this chute for cutting the grain, a flexible endless belt-like reel and rake member 4 supported by said chute, and mechanism for driving and supporting the belt-like member 4 and raising and lowering the front end thereof.

The belt-like member 4 as shown comprises a pair of sprocket chains 5 connected together by transversely extending channel bars 6, which channel bars engage the material 7 to be cut and hold it against the sickle and after the material is cut feed the material upwardly and rearwardly along the chute 1 to deliver it to the feed auger 8 which feeds it to the cylinder of the threshing apparatus. Each of the sprocket chains 5 is supported and guided by means of a rotatable front sprocket wheel 9, a rotatable rear drive sprocket wheel 10, and a rotatable idler sprocket 11.

In order to provide for the up-and-down adjustment of the front sprocket wheels to take care of grain of different heights, they are mounted on a transversely extended shaft 12, the ends of which are carried by bearings 13 on adjustable bell crank levers 14 pivotally mounted at 15 on

2 the sides 16 of the chute. Spring means 17 are provided secured at 18 to the downwardly extending arms 19 of the pivoted levers 14 and secured at 20 to the under side of the chute, urging the front ends of the levers 14 and the sprocket wheels 9 carried thereby upwardly. The distance which the spring means 17 can force the sprockets 9 upwardly is limited by the idler sprockets 11. In order to provide for the raising and lowering movement of the front end of the endless belt-like member 4, the idler sprockets 11 are made adjustable longitudinally of the chute from the position shown at A to the dotted-line position shown at B. As the sprockets are moved downwardly and forwardly, the front sprockets 9 are lowered and at the same time the lentgh of the portion of the flexible member extending parallel to the bottom of the chute 1 is increased.

To provide for this sliding motion of the bearings 21 which carry the sprocket wheels 11, they are slidably mounted in guides 22 extending longitudinally in the sides 16 of the chute, and cables 23 are secured to these sliding bearing brackets 21, respectively, which run over pulleys 24 adjacent the lower end of the chute and thence rearwardly to pulleys 25 at the upper rear end of the chute. Rotation of the pulley 25 is effected by means of a lever 26 pivotally mounted on the drawbar 27 within easy reach of the tractor operator. The transmission from the lever 26 to the pulley 25 and hence to the bearings 21 carrying the sprocket wheels 11 comprises a pulley 28 of smaller diameter than the pulley 25 mounted on the same shaft 29 on which the pulley 25 is mounted, and a cable 30 secured to this pulley, passing thereover, extending forwardly and secured to the lever 26. The design is such that a full movement of the lever 26 will cause the bearings 21 to travel the full length of the guides 22. It will be noted that the pulley 28 is smaller than the pulley 25 so that the cable 23 will travel a greater distance than the cable 30. The driver of the tractor, by means of the lever 26, may instantly raise or lower the effective height of the rake as may be necessary to suit conditions encountered at the moment. A latch and quadrant 31 may be provided for holding the lever in adjusted position. As the lever 26 is moved forwardly, the sprockets 11 will be drawn downwardly and forwardly against the resisting action of the sprocket chains 5 and of the spring means 17 which hold the sprockets 9 as far up as the sprockets 11 will permit.

In use, if tall grain is to be cut, the lever 26 will be operated to allow the sprocket wheel 11 to rise to the full-line position shown at A in Fig. 1, in which the cross channels or slats 6 on the endless member will properly engage the tall grain adjacent the upper ends of the stalks and bend it rearwardly, holding it in engagement with the sickle. If the material to be cut is relatively short, the lever may be operated to draw the sprockets 11 down to the dotted-line position shown at B in Fig. 1, in which the slats on the endless member will engage the grain to be cut adjacent the upper end of the stalk and bend it over and hold it against the sickle. In this lowering movement of the sprocket wheels, the idler sprockets have been moved downwardly and forwardly to the position shown in dotted lines, so that the portion of the endless member which extends parallel to the chute or deck is lengthened in a forward and downward direction in position to engage the grain as soon as it has been cut and carry it upwardly and rearwardly.

Further modifications will be apparent to those skilled in the art and it is desired, therefore, that the invention be limited only by the scope of the appended claims.

Having thus described my invention, what I claim and desire to secure by Letters Patent is:

1. A reel and rake apparatus for harvester machines comprising a sickle, an inclined chute leading rearwardly and upwardly from the sickle, a flexible endless belt-like reel and rake member having transverse raking bar members thereon, and guide means for said belt-like member including rotors about which said belt-like member passes, one of said rotors being adjacent and spaced from the upper end of said chute, the second rotor being located at a point midway of the length of said chute and spaced therefrom a distance substantially the same as that of the first rotor, and the third rotor being located adjacent the lower end of said chute forwardly thereof and in substantially the same horizontal plane as the second mentioned rotor, the second mentioned rotor being adjustable longitudinally of the chute and the last mentioned rotor being adjustably mounted for vertical movement.

2. A reel and rake apparatus for harvester machines comprising a sickle, an inclined chute leading rearwardly and upwardly from the sickle, a flexible endless belt-like reel and rake member having transverse raking bar members thereon, and guide means for said belt-like member including rotors about which said belt-like member passes, one of said rotors being adjacent and spaced from the upper end of said chute, the second rotor being located at a point midway of the length of said chute and spaced therefrom a distance substantially the same as that of the first rotor, and the third rotor being located adjacent the lower end of said chute forwardly thereof and in substantially the same horizontal plane as the second mentioned rotor, the second mentioned rotor being adjustable longitudinally of the chute and the last mentioned rotor being adjustably mounted for vertical movement, the mounting for the last mentioned rotor comprising an upwardly biased arm pivotally mounted in the rear of said rotor.

3. A reel and rake apparatus for harvester machines comprising a sickle, an inclined chute leading rearwardly and upwardly from the sickle, a flexible endless belt-like reel and rake member having transverse raking bar members thereon, and guide means for said belt-like member including rotors about which said belt-like member passes, one of said rotors being adjacent and spaced from the upper end of said chute, the second rotor being located at a point midway of the length of said chute and spaced therefrom a distance substantially the same as that of the first rotor, and the third rotor being located adjacent the lower end of said chute forwardly thereof and in substantially the same horizontal plane as the second mentioned rotor, the second mentioned rotor being adjustable longitudinally of the chute and the last mentioned rotor being adjustably mounted for vertical movement, the adjusting means for the longitudinally adjustable rotor comprising a pulley located forwardly and downwardly from the longitudinally adjustable rotor, a second pulley located rearwardly and upwardly from said first pulley, and a flexible element secured in tractive relation to said longitudinally adjustable rotor and passing over said pulleys.

HOUSTON N. IRVINE.

REFERENCES CITED

The following references are of record in the file of this patent:

UNITED STATES PATENTS

| Number | Name | Date |
|---|---|---|
| 991,213 | Van Kooy | May 2, 1911 |
| 2,084,049 | Rosenvold | June 15, 1937 |
| 2,317,127 | Bowling | Apr. 20, 1943 |
| 2,329,596 | Dalimata | Sept. 14, 1943 |

FOREIGN PATENTS

| Number | Country | Date |
|---|---|---|
| 548,892 | Great Britain | Oct. 28, 1942 |